Patented Jan. 23, 1934

1,944,598

UNITED STATES PATENT OFFICE 1,944,598

PROCESS FOR THE MANUFACTURE OF BORIC ACID

Emil Franke, Grunau-Berlin, Germany, assignor to Chemische Fabrik Grunau Landshoff & Meyer Aktiengesellschaft, Grunau-Berlin, Germany No Drawing. Application September 30, 1930, Serial No. 485,554, and in Germany October 22, 1929

4 Claims. (Cl. 23—149)

The application of boric minerals containing magnesium for the manufacture of boric acid by decomposition with sulphuric acid offers great difficulties owing to the unfavourable conditions of solubility of magnesium sulphate and boric acid when present side by side, since only a portion of the boric acid can be obtained free from magnesium sulphate. I have found that the magnesium can be separated from solutions containing magnesium as well as boric acid, so that the crystallization of boric acid is not interfered with, if the solutions are concentrated after previous addition of sodium sulphate, whereby a double salt of sodium sulphate and magnesium sulphate crystallizes out. In place of sodium sulphate, I may use sodium borate and sulphuric acid inasmuch as these substances are converted into sodium sulphate and boric acid, as is well known. After filtering sodium sulphate and magnesium sulphate off from this double salt and cooling the mother liquor, sulphate-free boric acid crystallizes out. For the purpose of the present process I may also use boric minerals, containing sodium and magnesium, the latter possibly as an impurity, because upon the decomposition of these minerals with sulphuric acid and for the purpose of liberating boric acid, sodium sulphate and magnesium sulphate are formed which are separated out as a double salt upon evaporation. Such boric minerals are kernite and rasorite which, in the commercial form, always contain magnesium as an impurity.

When using kernite the process is carried out as follows:

To 800 litres of water 310 kilos of kernite containing 58.5% $B(OH)_3$, 15% $Na_2O$ and 2% MgO are added. The mass is then heated and while stirring sulphuric acid is added until all the boric acid is set free. I then filter the mass and on cooling boric acid separates out from the filtrate. The mother liquor from the boric acid is used over again for a new batch by adding 170 kilos of kernite and a corresponding quantity of sulphuric acid; the mixture is worked up as before. That operation is repeated with the same liquor until it is approximately saturated with sodium sulphate, whereupon it is concentrated. From 1000 litres of such liquor containing 312 gr $Na_2SO_4$, 66 gr $MgSO_4$ and 75 gr $B(OH)_3$ per litre were obtained by boiling down to 350 litres about 201 kilos of a crystalline mixture containing 0.6% $B(OH)_3$, 18.2% $MgSO_4$ and 49.2% $Na_2SO_4$. On cooling the residual liquor a further quantity of 35 kilos boric acid of 98.5% $B(OH)_3$ was obtained. The remaining mother liquor contained 375 gr $Na_2SO_4$, 61 gr $MgSO_4$ and 75 gr $B(OH)_3$ per litre.

The percentage of magnesium in the sulphate separated is proportionally higher than that of the final liquor, so that contrary to the normal solubility of magnesium sulphate a decrease of the magnesium sulphate in the solutions takes place.

It is also possible to employ a cyclical process in such a manner that one starts from a liquor, the sulphate contents of which is so regulated, that by adding the required quantity of kernite and sulphuric acid in the heat the liquor is just saturated with sulphates. From that liquor, on cooling, boric acid free from sulphate is separated and the mother liquor after the addition of thin washing liquors is used for a new batch, while the remaining solution is concentrated, and after crystallizing out the sulphates is returned in the cyclical process.

From the foregoing it will be understood, that the essence of the invention consists in decomposing boric minerals containing magnesium by sulphuric acid, so that the magnesium sulphate primarily formed in solution is separated out as a double salt along with sodium sulphate.

What I claim is:—

1. A process for the manufacture of boric acid from boric minerals containing magnesium, which comprises heating said minerals with hot sulphuric acid in the presence of sodium borate, so that a solution of boric acid, magnesium sulphate and sodium sulphate is produced, cooling said solution to separate a portion of the boric acid, concentrating the resulting liquor to the point where it is saturated with $Na_2SO_4$ to separate sodium-magnesium sulphate therefrom and cooling the hot liquor to crystallize further quantities of boric acid free from sulphate.

2. The process as defined in claim 1 wherein the mineral employed is kernite containing magnesium compounds as impurities.

3. The process as defined in claim 1 wherein the mineral employed is rasorite containing magnesium compounds as impurities.

4. The process for producing boric acid from kernite containing magnesium compounds as impurities which comprises decomposing the kernite while hot with sufficient sulfuric acid to set all the boric acid free, filtering the reaction mixture, crystallizing boric acid from the filtrate, adding further amounts of kernite and sulfuric acid to the resulting mother liquor and repeating the above steps until the mother liquor is saturated with sodium sulfate, concentrating the saturated solution to precipitate the sodium and magnesium sulfates as a double sulfate, and crystallizing further amounts of boric acid from the resulting mother liquor.

EMIL FRANKE.